(12) United States Patent
Feki et al.

(10) Patent No.: US 12,085,662 B2
(45) Date of Patent: Sep. 10, 2024

(54) RADIO MAP IMPROVEMENTS

(71) Applicant: Nokia Solutions and Networks Oy, Espoo (FI)

(72) Inventors: Afef Feki, Massy (FR); Veronique Capdevielle, Magny les Hameaux (FR); Fahad Syed Muhammad, Massy (FR); Anna Pantelidou, Massy (FR); Muhammad Majid Butt, Naperville, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 18/345,570

(22) Filed: Jun. 30, 2023

(65) Prior Publication Data

US 2024/0012088 A1  Jan. 11, 2024

(30) Foreign Application Priority Data

Jul. 7, 2022  (FI) ..................................... 20225640

(51) Int. Cl.
*G01S 5/02*  (2010.01)
(52) U.S. Cl.
CPC ................. *G01S 5/02524* (2020.05)
(58) Field of Classification Search
CPC .................................................. G01S 5/02524
(Continued)

(56) References Cited

U.S. PATENT DOCUMENTS 8,594,674 B2  11/2013  Jung et al.
9,173,056 B2  10/2015  Maurin et al.
(Continued)

FOREIGN PATENT DOCUMENTS

CN  102210180 A  10/2011
CN  112005574 A  11/2020
(Continued)

OTHER PUBLICATIONS

"3rd Generation Partnership Project; Technical Specification Group Radio Access Network; Universal Terrestrial Radio Access (UTRA), Evolved Universal Terrestrial Radio Access (E Utra) and Next Generation Radio Access; Radio measurement collection for Minimization of Drive Tests (MDT); Overall description; Stage 2 (Release 16)", 3GPP TS 37.320, V16.0.0, Mar. 2020, pp. 1-34.
(Continued)

*Primary Examiner* — William Nealon
(74) *Attorney, Agent, or Firm* — SQUIRE PATTON BOGGS (US) LLP

(57) ABSTRACT

Disclosed is a solution for managing a radio map based on radio fingerprinting measurements. A method comprises: acquiring a radio map of an area, the radio map based on radio frequency measurements performed between at least one access node of a wireless network and terminal devices within the area; detecting at least one gap in the radio map and determining geographical coordinates of the at least one gap; causing transmission of a message comprising at least one information element requesting for additional measurements and comprising the geographical coordinates of the at least one gap; in response to the message, receiving at least one radio frequency measurement report related to at least one terminal device and comprising radio frequency measurement data and at least one measurement location where the radio frequency measurement data has been measured; and updating the radio map on the basis of the radio frequency measurement data.

9 Claims, 6 Drawing Sheets

(58) Field of Classification Search
USPC .................................................... 455/456.2
See application file for complete search history.

(56) References Cited

U.S. PATENT DOCUMENTS

| | | | |
|---|---|---|---|
| 9,467,803 B2 | 10/2016 | Siomina et al. | |
| 9,832,750 B2 | 11/2017 | Wigren et al. | |
| 9,838,896 B1* | 12/2017 | Barnickel | H04W 4/027 |
| 2012/0108199 A1* | 5/2012 | Wang | H04W 24/10 709/224 |
| 2012/0329507 A1* | 12/2012 | Watanabe | H04W 24/10 455/517 |
| 2013/0109405 A1 | 5/2013 | Siomina et al. | |
| 2013/0188510 A1 | 7/2013 | Siomina et al. | |
| 2014/0274149 A1 | 9/2014 | Alfalujah et al. | |
| 2015/0223027 A1* | 8/2015 | Ahn | G01S 5/02527 455/456.1 |
| 2015/0312876 A1* | 10/2015 | Syrjärinne | G01S 5/02524 455/456.1 |
| 2016/0165566 A1 | 6/2016 | Jung | |
| 2017/0371023 A1* | 12/2017 | Syrjärinne | G01S 5/02521 |
| 2020/0128369 A1* | 4/2020 | Ivanov | G01S 5/02526 |
| 2020/0196353 A1 | 6/2020 | Zhang et al. | |
| 2022/0182793 A1 | 6/2022 | Graefe et al. | |

FOREIGN PATENT DOCUMENTS

| | | |
|---|---|---|
| CN | 113287348 A | 8/2021 |
| CN | 114556843 A | 5/2022 |
| EP | 2928244 B1 | 11/2016 |
| WO | 2017/033141 A1 | 3/2017 |
| WO | 2021/004629 A1 | 1/2021 |
| WO | 2022/075893 A1 | 4/2022 |

OTHER PUBLICATIONS

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"#MWC19: CTC and Nokia advance the use of AI/ML powered 5G mMIMO scheduler at MWC 2019", Nokia, Feb. 26, 2019, Webpage available at : https://www.nokia.com/about-us/news/releases/2019/02/26/mwc19-ctc-and-nokia-advance-the-use-of-aiml-powered-5g-mmimo-scheduler-at-mwc-2019/.

Jian et al., "Deep Learning for RF Fingerprinting: A Massive Experimental Study", IEEE Internet of Things Magazine, vol. 3, No. 1, Mar. 2020, pp. 50-57.

Khandker et al., "Positioning Error Prediction and Training Data Evaluation in RF Fingerprinting Method", International Conference on Indoor Positioning and Indoor Navigation (IPIN), Sep. 30-Oct. 3, 2019, 7 pages.

Pan et al., "P-Persistent Energy-Aware Handover Decisions Employing RF Fingerprint for Adaptive-Sized Heterogeneous Cellular Networks", IEEE Access, vol. 7, Apr. 23, 2019, pp. 52929-52944.

Michel Floch et al., "Spatial distribution of points", Handbook of Spatial Analysis, Oct. 2018, pp. 71-111.

Narayanan, "Spectral Performance Management", Nokia, Aug. 8, 2019, 44 pages.

Ma et al., "LTE user equipment RSRP difference elimination method using multidimensional scaling for LTE fingerprint-based positioning system", IEEE International Conference on Communications (ICC), May 21-25, 2017, 6 pages.

Butt et al., "ML-Assisted UE Positioning: Performance Analysis and 5G Architecture Enhancements", IEEE Open Journal of Vehicular Technology, vol. 2, Sep. 3, 2021, pp. 377-388.

Leppäkoski et al., "Optimizing radio map for WLAN fingerprinting", Ubiquitous Positioning Indoor Navigation and Location Based Service, Oct. 14-15, 2010, 8 pages.

"Universal Mobile Telecommunications System (UMTS); LTE; Universal Terrestrial Radio Access (UTRA) and Evolved Universal Terrestrial Radio Access (E-UTRA); Radio measurement collection for Minimization of Drive Tests (MDT); Overall description; Stage 2 (3GPP TS 37.320 version 12.2.0 Release 12)", ETSI TS 137 320, V12.2.0, Sep. 2014, 27 pages.

Office action received for corresponding Finnish Patent Application No. 20225640, dated Dec. 15, 2022, 9 pages.

"New SI: Study on Artificial Intelligence (AI)/Machine Learning (ML) for NR Air Interface", 3GPP TSG RAN Meeting #94e, RP-213599, Agenda: 8.6.1. Qualcomm, Dec. 6-17, 2021, 6 pages.

Office action received for corresponding Finnish Patent Application No. 20225640, dated Jun. 12, 2023, 5 pages, with application documents found acceptable, 37 pages.

Extended European Search Report issued in corresponding European Patent Application No. 23182746.0-1206 on Jan. 25, 2024.

Chinese Office Action issued in corresponding Chinese Patent Application No. 202310830154.2 on Apr. 15, 2024.

* cited by examiner

RADIO MAP IMPROVEMENTS

FIELD

Various embodiments described herein relate to the field of wireless communications and, particularly, to generating and updating a radio map for use in configuring operation of a wireless network.

BACKGROUND

Radio frequency (RF) fingerprinting-based applications are getting increasing interest from wireless communications actors due to their promising optimizations in several application fields. The RF fingerprinting may be used to generate a radio map for use in configuring operational parameters of network nodes of a wireless network such as a cellular communication system, e.g. handovers and multi-connectivity or carrier aggregation. Any lack of precision in the radio map may degrade the performance of such solutions and the network.

BRIEF DESCRIPTION

Some aspects of the invention are defined by the independent claims.

Some embodiments of the invention are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided an apparatus comprising: at least one processor; and at least one memory storing computer program instructions that cause, with the at least one processor, the apparatus to perform the following: acquiring a radio map of an area, the radio map based on radio frequency measurements performed between at least one access node of a wireless network and terminal devices within the area; detecting at least one gap in the radio map and determining geographical coordinates of the at least one gap; causing transmission of a message comprising at least one information element requesting for additional measurements and comprising the geographical coordinates of the at least one gap; in response to the message receiving at least one radio frequency measurement report related to at least one terminal device and comprising radio frequency measurement data and at least one measurement location where the radio frequency measurement data has been measured; and updating the radio map on the basis of the radio frequency measurement data.

According to an aspect, there is provided an apparatus comprising: at least one processor; and at least one memory storing computer program instructions that cause with the at least one processor the apparatus to perform the following: receiving, via an access node of a wireless network, a message comprising at least one information element requesting for radio frequency measurements and comprising geographical coordinates of the at least one area for the radio frequency measurements; in response to the message, determining a current location of the apparatus and if the current location is within the at least one area, performing said requested radio frequency measurements and causing transmission of at least one measurement report comprising measurement data based on the performed radio frequency measurements; and if the current location is outside the at least one area, omitting said radio frequency measurements.

According to an aspect, there is provided a method for a network node, comprising: acquiring a radio map of an area, the radio map based on radio frequency measurements performed between at least one access node of a wireless network and terminal devices within the area; detecting at least one gap in the radio map and determining geographical coordinates of the at least one gap; causing transmission of a message comprising at least one information element requesting for additional measurements and comprising the geographical coordinates of the at least one gap; in response to the message, receiving at least one radio frequency measurement report related to at least one terminal device and comprising radio frequency measurement data and at least one measurement location where the radio frequency measurement data has been measured; and updating the radio map on the basis of the radio frequency measurement data.

According to an aspect, there is provided a method for a terminal device, comprising: receiving, via an access node of a wireless network, a message comprising at least one information element requesting for radio frequency measurements and comprising geographical coordinates of the at least one area for the radio frequency measurements; in response to the message, determining a current location of the apparatus and: if the current location is within the at least one area, performing said requested radio frequency measurements and causing transmission of at least one measurement report comprising measurement data based on the performed radio frequency measurements; and if the current location is outside the at least one area, omitting said radio frequency measurements.

According to an aspect, there is provided a computer program product embodied on a computer-readable medium and comprising a computer program code readable by a computer, wherein the computer program code configures the computer to carry out a computer process comprising: receiving, via an access node of a wireless network, a message comprising at least one information element requesting for radio frequency measurements and comprising geographical coordinates of the at least one area for the radio frequency measurements; in response to the message, determining a current location of the apparatus and if the current location is within the at least one area, performing said requested radio frequency measurements and causing transmission of at least one measurement report comprising measurement data based on the performed radio frequency measurements; and if the current location is outside the at least one area, omitting said radio frequency measurements.

According to an aspect, there is provided a computer program product embodied on a computer-readable medium and comprising a computer program code readable by a computer, wherein the computer program code configures the computer to carry out a computer process comprising: acquiring a radio map of an area, the radio map based on radio frequency measurements performed between at least one access node of a wireless network and terminal devices within the area; detecting at least one gap in the radio map and determining geographical coordinates of the at least one gap; causing transmission of a message comprising at least one information element requesting for additional measurements and comprising the geographical coordinates of the at least one gap; in response to the message, receiving at least one radio frequency measurement report related to at least one terminal device and comprising radio frequency measurement data and at least one measurement location where the radio frequency measurement data has been measured; and updating the radio map on the basis of the radio frequency measurement data.

LIST OF DRAWINGS

Embodiments are described below, by way of example only, with reference to the accompanying drawings, in which FIG. 1 illustrates a wireless communication scenario to which some embodiments of the invention may be applied;

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
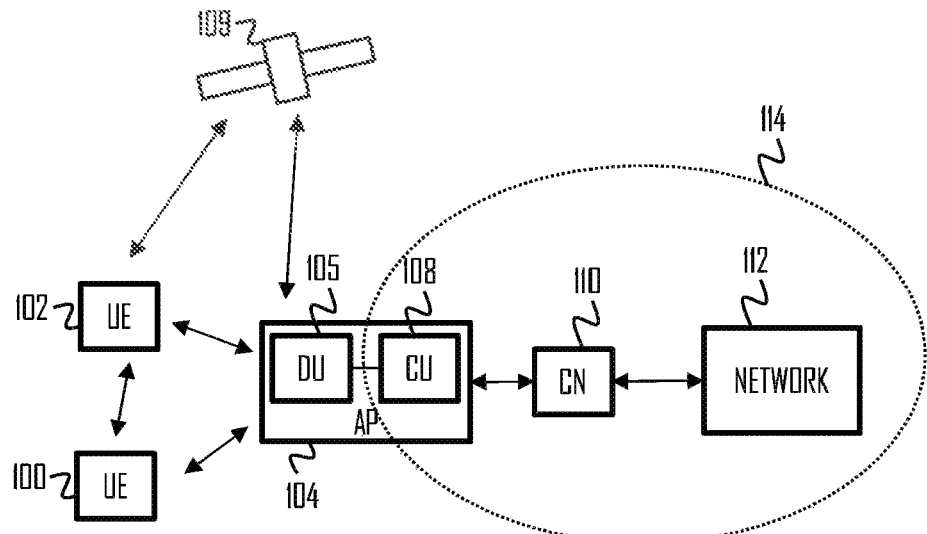

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows terminal devices or user devices 100 and 102 configured to be in a wireless connection on one or more communication channels in a cell with an access node (such as (e/g)NodeB) 104 providing the cell. (e/g)NodeB refers to an eNodeB or a gNodeB, as defined in 3GPP specifications. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station. 5G specifications define two relay modes: out-of-band relay where same or different carriers may be defined for an access link and a backhaul link; and in-band-relay where the same carrier frequency or radio resources are used for both access and backhaul links. In-band relay may be seen as a baseline relay scenario. A relay node is called an integrated access and backhaul (IAB) node. It has also inbuilt support for multiple relay hops. IAB operation assumes a so-called split architecture having CU and a number of DUs. An IAB node contains two separate functionalities: DU (Distributed Unit) part of the IAB node facilitates the gNB (access node) functionalities in a relay cell, i.e. it serves as the access link; and a mobile termination (MT) part of the IAB node that facilitates the backhaul connection. A Donor node (DU part) communicates with the MT part of the IAB node, and it has a wired connection to the CU which again has a connection to the core network. In the multihop scenario, MT part (a child IAB node) communicates with a DU part of the parent IAB node.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses. In the context of the embodiments described below, the user device may be a personal device of a user, and the user may use the user device for various communication services including voice calls, messaging, internet access, gaming, etc. The network may use such user devices for carrying out radio frequency (RF) measurements to measure, for example, coverage of the radio access network of access nodes. The 3GPP specifications define a standardized mechanism for such measurements, and the standard specification is called minimization of drive testing (MDT). For example ETSI technical specification TS 137 320 v12.2.0 defines such a mechanism. The standard specifications describe functions and procedures to support collection of UE-specific measurements for MDT using a control plane architecture of the radio access network, for LTE, 5G and beyond 5G. Details of the signaling procedures for the operation are specified in the appropriate radio interface protocol specifications. Network operation and overall control of MDT is described in operation and maintenance (OAM) specifications. The support for the MDT distinguishes the user device from special-purpose measurement devices dedicated to the RF measurements that require the cumbersome and laborious drive testing.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control). 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave-sub-THz). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and typically fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network or the Internet, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV)

and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 105) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 109 in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

FIG. 1 further illustrates direct device-to-device communication links between the terminal devices 100, 102. These links may correspond to the sidelinks described in Background and defined in 3GPP specifications for 5G, for example. The sidelink is a communication paradigm in which the terminal devices communicate without relaying their data via the radio access network, e.g. the access node 104. That means that terminal devices may create an ad hoc network without using the radio access network as an intermediary. And as described in Background, the sidelinks may be employed for various purposes, e.g. the positioning of a terminal device.

As described in Background, the RF fingerprinting may be used for generating a radio map of an area-of-interest. The radio map may be used for configuring the operational parameters of the radio access network, terminal devices, and/or radio connections with the radio access network. This includes radio resource management, multi-connectivity, etc. Further applications using the radio map according to the embodiments described herein include various services provided within the wireless network, e.g. positioning of terminal devices. Some examples of the operational parameters are described in the Background, and they are applicable to the embodiments below.

Figure 2:
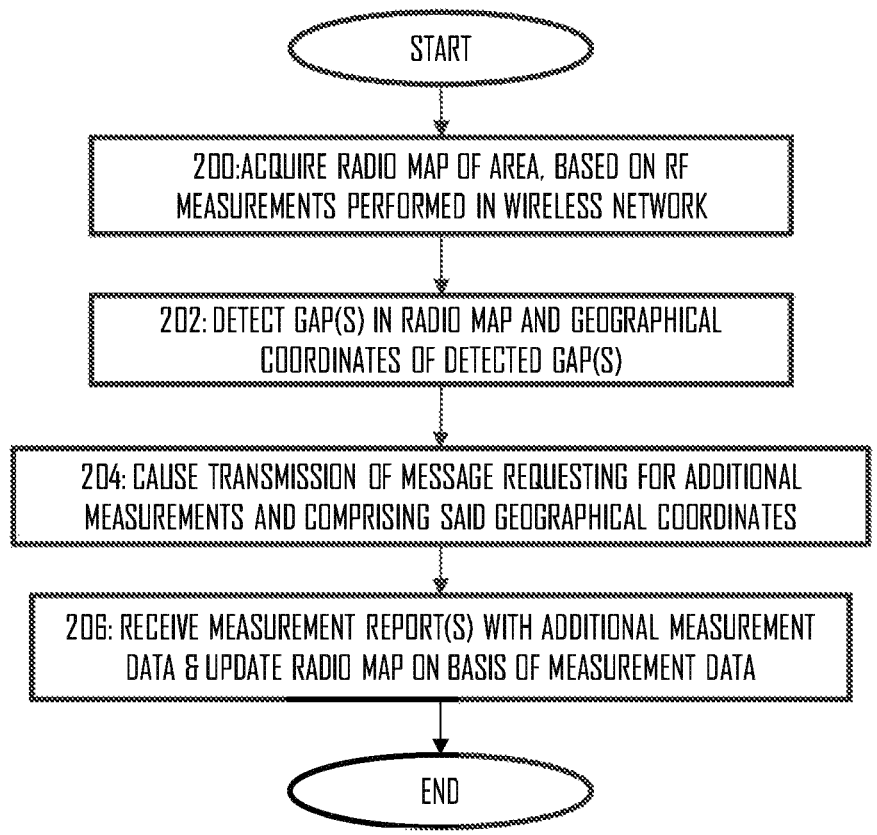
FIGS. 2 and 3 illustrate flow diagrams of processes for updating a radio map according to some embodiments.
Figure 3:
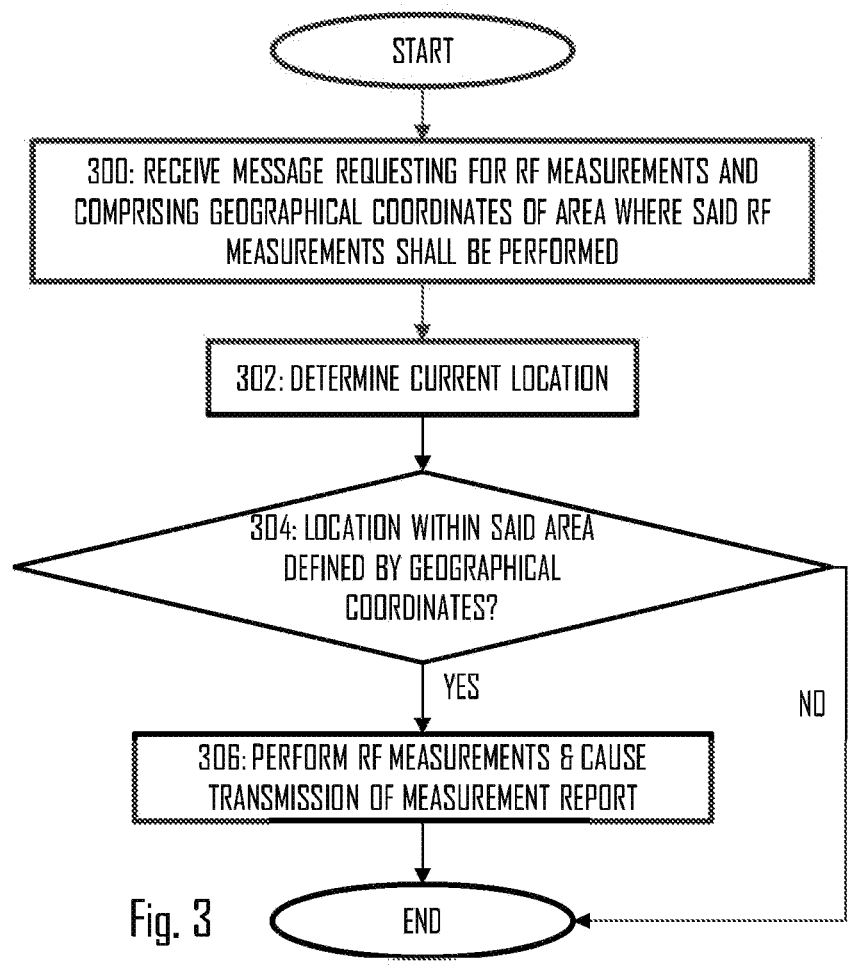

FIGS. 2 and 3 illustrate embodiments for updating the radio map of a coverage area of the radio access network (or more generally a wireless network). FIG. 2 illustrates a process for a network node such as a radio intelligent controller (RIC), operation, administration, and maintenance (OAM) function, or a network data analytics function (NWDAF) specified within the 3GPP for 5G networks. As known from the literature, the NWDAF is a 5G core network function that collects data from other network functions of the 5G core network and provides analytics services to support network automation and adaptive configuration of the radio access network, for example. A RIC is a software-defined component of Open Radio Access Network (O-RAN) architecture. Its tasks include controlling and optimizing RAN functions and configurations, e.g. on the basis of the analytics service from the NWDAF. The RIC enables third-party applications that automate and optimize RAN operations. The OAM function is also a network entity (node) that manages the operation of the radio access network, and adapts operational parameters of the radio access network, e.g. on the basis of the radio map. The tasks may be divided between the OAM and the RIC in a versatile manner. Network nodes with similar capabilities and responsibilities may be found in other wireless networks. FIG. 3 illustrates a process for a terminal device, e.g. the terminal device 100.

Referring to FIG. 2, the process at the network node comprises: acquiring (block 200) a radio map of an area, the radio map based on radio frequency measurements performed between at least one access node of a wireless network and terminal devices within the area; detecting (block 202) at least one gap in the radio map and determining geographical coordinates of the at least one gap; causing transmission of a message comprising at least one information element requesting for additional measurements and comprising the geographical coordinates of the at least one gap; in response to the message, receiving (block 206) at least one radio frequency measurement report related to at least one terminal device and comprising radio frequency measurement data and at least one measurement location where the radio frequency measurement data has been measured; and updating (block 206) the radio map on the basis of the radio frequency measurement data.

In an embodiment, the process further comprises configuring or reconfiguring at least one parameter of the wireless network on the basis of the updated radio map.

Referring to FIG. 3, the process at the terminal device comprises: receiving (block 300), via an access node of a wireless network, a message comprising at least one information element requesting for radio frequency measurements and comprising geographical coordinates of the at least one area for the radio frequency measurements;

in response to the message, determining (block 302) a current location of the apparatus and:
if the current location is within the at least one area (as determined in block 304), performing (block 306) said requested radio frequency measurements and causing transmission of at least one measurement report comprising measurement data based on the performed radio frequency measurements; and
if the current location is outside the at least one area (as determined in block 304), omitting said radio frequency measurements.

In an embodiment, the terminal device is a user device configured to execute at least one computer program application and to transfer payload data of the at least one computer program application through the wireless network. Accordingly, the primary purpose of the user device may be to provide the user with wireless data transfer services and not to carry out the RF fingerprinting measurements. Accordingly, the user device may support the MDT specifications and to communicate with the radio access network via the MDT protocol.

In an embodiment, if we denote by A the area where measurements are requested, then the terminal device triggers the measurements (only) if $x_{UE} \in A$, with $x_{UE}$ being the position of the terminal device, as measured by using a global navigation satellite system (GNSS) or via a positioning service of the cellular communication system.

In the above-described processes, the additional RF measurements are defined in terms of geographical coordinates that enable arbitrary definition of the area where the additional measurements are needed to fill the gap(s). This is different from solutions where the geographical resolution is defined in a raster of a cell or a beam. A technical advantage is improved control for the additional measurements and faster update of the radio map to reach precision requirements set to the radio map, as described below. Furthermore, measurements in areas outside the gaps can be avoided, thus also reducing signaling overhead.

In an embodiment, the geographical coordinates define boundaries of the at least one gap.

The embodiments of FIGS. 2 and 3 cover both uplink performed and reported by the terminal device and downlink measurements performed and reported by the access node(s). In case of downlink measurements, the terminal device may measure reference signals received from access nodes (e.g. a received signal strength indicator or a reference signal received power or a corresponding metric) upon determining that the terminal device is within the geographical area specified in the message. In case of uplink measurements, the access node may monitor locations of the terminal devices (according to the state of the art positioning) and measure uplink signals received from the terminal devices positioned to the geographical area specified in the message. Alternatively, the terminal device may trigger transmission of a reference signal upon receiving the message and determining that the terminal device is within the geographical area specified in the message. The reference signal may be transmitted in connection with an indicator that the reference signal is for the RF fingerprinting and/or updating the radio map so that the access node is capable of generating and sending the measurement report to the network node performing the process of FIG. 2. Such an indicator may be a location of the terminal device, for example, that the access node may add to the measurement report.

Figure 4:
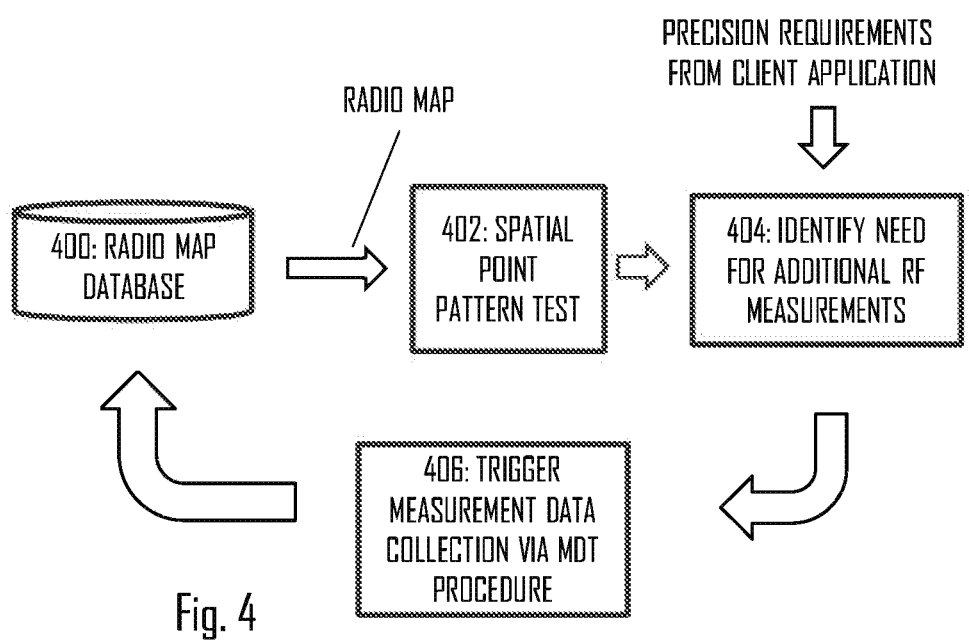
FIG. 4 illustrates an embodiment of a procedure for determining a need to update the radio map.

Let us then describe some embodiments of FIG. 2. FIG. 4 illustrates a logical diagram of an embodiment of the procedure of FIG. 2. The radio map may be stored in a radio map database 400, and the radio map may be generated according to the state-of-the-art. For example, drive testing or MDT procedures may be used for generating the radio map. The network node may, acquire (block 402) the radio map for the above-described area from the database 400. The area may be the whole coverage area of the radio map or a sub-area of the radio map, depending on a need. For example, the network node may receive from a client application (of a network node carrying out the configuration of the radio access network) a request for the radio map of the area. The request may also specify precision requirements for the radio map. The radio map acquired from the database may comprise at least information on measurement locations of RF fingerprinting measurements that have been conducted to form the radio map. Particularly if the radio map has been generated via the MDT procedures, the spatial distribution of the measurement locations may be unpredictable. The information on the measurement locations may comprise geographical coordinates of each measurement location, for example. The geographical may be provided in a universal coordination system or in another coordination system known to the network node. Upon acquiring the radio map, the network node carrying out the procedure of FIG. 2 may conduct a spatial point pattern test on the measurement locations (block 402). The spatial point pattern test may comprise an algorithm comprising one or more parameters describing how the measurement locations are distributed in the area. More detailed embodiments are described below. The algorithm may comprise pattern detection, measurement point distance computation or other computations that enable the network node to detect the gap(s) in the spatial distribution.

The definition of the gap may come from the precision requirements. The precision requirements may describe required density of measurement locations in the area of the radio map. A certain spatial distribution may contain no gaps if the precision requirements are loose enough. On the other hand, if the precision requirements are high, the certain spatial distribution may be detected to have gaps. The precision requirements may be characterized via granularity information such as mean inter-point distance d in meters (or in another distance metric). An indication of the allowed deviation δ around the mean value may be also indicated by the precision requirements. This may be understood such that it is required that the distance between a measurement location and its N closest neighboring measurement locations should be in the range [d−δ,d+δ]. N may be selected to have a determined value, e.g. 1, 2, 3, or 4. In case N is greater than one, the N may be selected to different directions from the measurement location. In case there is at least one measurement location that does not fill this requirement, a gap may be detected in block 404. Certain geographical areas in the area can be excluded as not needed by the targeted application (see the embodiment of FIG. 9 for further disclosure). For example, a vast sea of lake can be excluded from the precision requirements. These areas can be defined via geographical coordinates in the request from the client application. Upon detecting the at least one gap in block 406, the network node may trigger the collection of the additional RF fingerprinting measurements in block 406. As a consequence, the network node may trigger transmission of the message that may be a MDT request message according to the MDT specifications. The MDT request message may comprise the geographical coordinates defining the gaps where the additional measurements are needed. Upon the terminal device(s) conducting the MDT measurements and associated measurement reporting with the access nodes, the network node may collect the additional measurement data and update the radio map in the radio map database 400.

Then, the network node may repeat blocks 402 to 406 until the precision requirements are satisfied. In this manner, a closed loop may be run. In fact, based on already collected measurements and the indicated requirements, the measurements needs are identified/updated. This can correspond for example to an area covered by a set of identified cells. Thanks to newly reported measurements, the RF fingerprinting map is augmented, and its precision and reliability increased. Thereafter, predefined ending conditions are verified to check whether the precision requirements are fulfilled. If yes, then this iterative process may be interrupted, and the completed radio map is transmitted to the client application and/or the radio map database 400. If not, a new iteration may be triggered to discover the new gap(s), to update the corresponding geographical coordinates, and to request for new MDT reports for the new gap(s).

Figure 5:
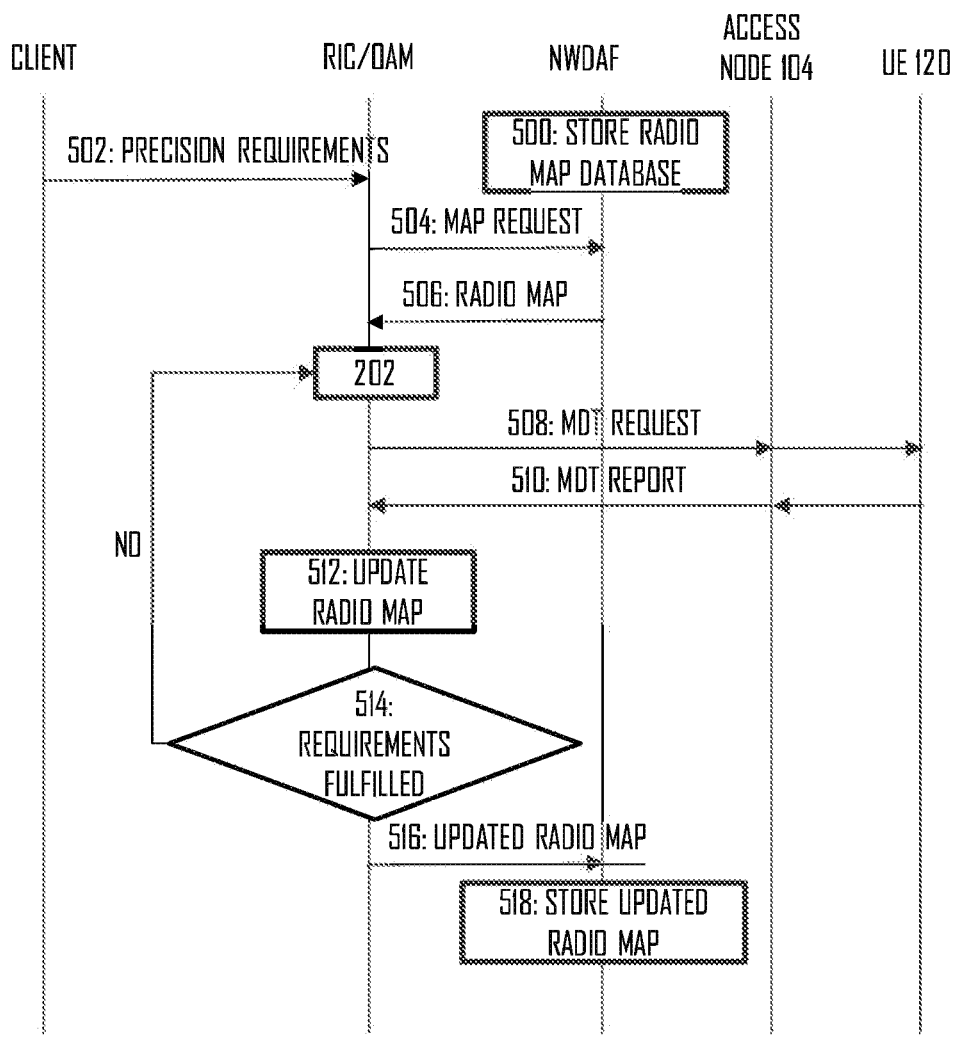
FIG. 5 illustrates a signalling diagram of an embodiment of a procedure between network elements of a cellular communication system.

FIG. 5 illustrates a signaling diagram of an embodiment combining the procedures of FIGS. 2 and 4 in the context where the wireless network is a 5G New Radio cellular communication system. Referring to FIG. 5, the NWDAF may store the radio map database 400 (block 500). The client application sends a request for the radio map and defines the precision requirements for the radio map in step 502. Additionally, the request may specify the area for which the radio map is requested. For example, the request may comprise geographical coordinates defining boundaries of the area. In an embodiment, the client application is executed in the RIC or OAM.

Upon receiving the request in step 502, the RIC/OAM function acquires the radio map from the NWDAF by transmitting a request for providing the radio map for the area. The request in step 502 may comprise the same definition of the area so that the NWDAF is capable of gathering the RF fingerprinting measurement data with respective measurement location coordinates from the radio map database 400. In step 506, the NWDAF sends the radio map for the desired are. The radio map may comprise, per measurement location, a measured metric (or metrics) and location coordinates of the measurement location.

In an embodiment, the radio map comprises, per measurement location, a measured signal strength metric per access node measured at the measurement location. The measurement location may be understood as a geographical location. In this manner, the radio map may indicate the coverage areas of the access nodes that can be used for configuring the above-described operational parameters.

Upon receiving the radio map for the area, the RIC or OAM carries out block 202 and evaluates the spatial distribution of the measurement locations on the basis of the precision requirements. As described above, blocks 402 and 404 together represent an embodiment of block 202. As a result, let us assume that the RIC or OAM detects the at least one gap in the radio map.

Upon detecting the at least one gap and the need for the additional RF measurements to fill the gap(s) and meet the precision requirements, the RIC or OAM determines the geographical boundaries of the gap(s) and respective geographical coordinates that define the boundaries and transmits (step 508) an MDT request comprising the geographical coordinates to be broadcasted by the access nodes of the radio access network.

In an embodiment the MDT request (or generally the message requesting for the additional RF measurements) may be transmitted to only that or those access nodes that provide coverage in the gap(s). In this manner, signaling overhead may be reduced.

Thereafter, the access nodes together with the terminal devices at the defined locations of the gap(s) may conduct the RF fingerprinting measurements, e.g. by measuring a signal strength metric per access node detected at each measurement location, and report the respective measurement data with the measurement locations to the RIC or OAM in an MDT report in step 510.

Upon receiving the measurement reports, the RIC or OAM may update the radio map with the measurement data and respective measurement locations and determine (block 514) whether or not the new measurement data at the respective measurement locations fulfills the precision requirements. If the precision requirements are not yet met, the process returns to block 202 to detect the remaining gap(s) in the radio map and to fill the gaps. If the precision requirements are met, the process proceeds to step 516 where the updated radio map (the new measurement data with the respective measurement locations) is sent to the NWDAF. In block 518, the NWDAF stores the new measurement data with the respective measurement locations in the radio map database 400.

In the embodiment of FIG. 5, the NWDAF stores the radio map database while the RIC or the OAM controls generation or at least updating (or both) the radio map. In other embodiments, the NWDAF stores the radio map database 400 and controls the generation or at least the updating (or both) the radio map. In such an embodiment, the signalling of steps 504, 506, 516 can be omitted, and the steps 402, 512, 514 are internal functions of the NWDAF.

Figure 6:
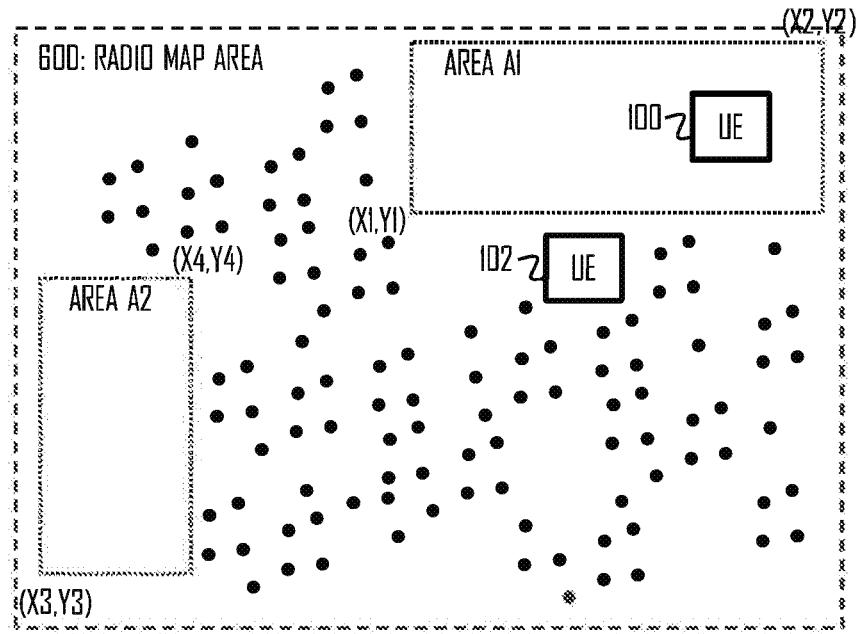
FIG. 6 illustrates a radio map area with measurement gaps and how the gaps may be identified in acquisition of augmenting measurement data.

As described above, the gaps are defined in the request for the additional measurements via geographical coordinates and not, for example, via cell identifiers, tracking areas, location areas or routing areas, that are not geographical but network topological ways of defining areas. As a consequence, the presented solution is also less sensitive to the changes in the network topology. This definition of the gap in the area may be in the standard specifications to enable A to be part of the MDT configuration (or generally measurement collection). The area A may be defined in the form of a rectangle area with indication of the rectangle extremes. FIG. 6 illustrates the radio map 600 of the area, as acquired from the radio map database. It also illustrates examples of the gaps in the form of two areas A1 and A2 defined as: $A_1=\{(x_1; y_1); (x_2; x_2)\}$ and $A_2=\{(x_3; y_3); (x_4; x_4)\}$. Accordingly, the rectangular gap may be defined via geographical coordinates of the opposite corners of the rectangular gap. A circular gap may be defined via geographical coordinates of a centre of the circular gap and a radius or diameter of the circular gap. Definitions of gaps in other geometric forms can be envisaged in a straightforward manner. Now, the terminal device 100 is in the area A1 and, upon receiving the request for the additional RF measurements specifying the area A1 and detecting to be in the area A1, the terminal device 100 conducts the RF measurements and sends the measurement report. The terminal device 102 not located in the area of the gaps A1 and A2 may receive the request and determine its location. Upon detecting to not be in the area A1 or A2, the terminal device omits the measurements.

In an embodiment where the radio access network tracks the locations of the terminal devices, the message requesting for the additional measurements may be a unicast or multicast message addressed to terminal devices located to the area(s) where the additional measurements are needed. In such a case, the access node or the network node may first determine the geographical boundaries of the gap(s), then use a location database storing locations of terminal devices to determine an identifier of one or more terminal devices located within the geographical boundaries of the gap(s), and to address the message(s) requesting for the additional measurements to such terminal device(s). The message(s) may thus identify such terminal device(s) as recipient(s) of the message. In this embodiment, the terminal device(s) may omit the positioning and directly proceed to performing the measurements upon receiving the message addressed to it/them.

In an embodiment, the network node carrying out the process of FIG. 2 conducts a spatial point pattern test on the radio map to determine the spatial distribution of the RF measurements in the area and to detect the at least one gap. The spatial point pattern test may be carried out blindly, based on the measurement locations of the radio map of the area. Literature of point pattern analysis provides some spatial point pattern tests that can be applied. The spatial point pattern test may be a Complete Spatial Random (CSR) process. The CSR process is defined as a realization of a Homogeneous Poisson (HP) process. The HP process considered as a reference model is defined as a point process satisfying two conditions: (1) The number of points within a spatial area A follows a Poisson distribution characterized by a rate parameter λ|A| (with |A| referring to the area of A and λ is the mean number of points per unit area, generally called as the intensity), and (2) The points are spread out independently within the considered spatial area A. This is equivalent to saying that the numbers of points in separate regions are independent. On a given area, we can test the CSR hypothesis using conventional methods based on the inter-point distance x between different points. The functional summary statistics evaluate the dispersion and the interaction between the points within the area of interest. In the following, J is a function to determine the spatial distribution pattern: For a CSR process the J function equals to one. Empirical values larger than 1 are indicative of uniformity, while values below 1 suggest clustering. The J function is a ratio of hazard functions defined for G and F:

$$J(d) = \frac{1 - G(d)}{1 - F(d)}$$

where G(d) is the nearest neighbour distance distribution function and F(d) is an empty space function.

Figure 7:
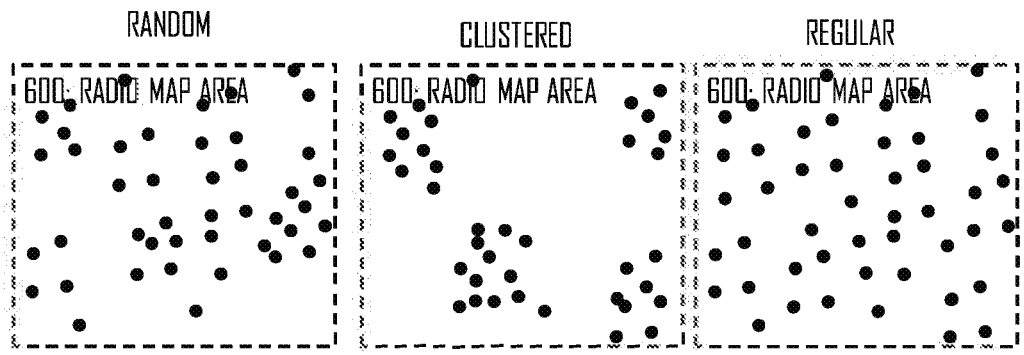
FIG. 7 illustrates examples of spatial distribution patterns for the radio map.

FIG. 7 illustrates some exemplary patterns that can be distinguished with the spatial point pattern test. If the spatial distribution of the measurement locations forms a clustered pattern, the measurement locations are concentrated to one or more sub-areas within the area, and distinguishable gaps can be seen between the clusters. In a regular spatial distribution of the measurement locations, the measurement locations are distributed evenly or substantially evenly in the area, and the distances between neighboring measurement locations are substantially equal or within a determined range defined for the regular spatial distribution. In the random spatial distribution, the measurement locations are also distributed substantially evenly over the area, but the distances between neighboring measurement locations have greater variance than in the regular pattern. These are three common spatial point distribution patterns, but different or further patterns may be used in the embodiments for detecting the gaps. The spatial point pattern test may be configured to classify the spatial distribution of measurement locations into one of a plurality of classes and to detect the at least one gap on the basis of the classification. The classes may include the classes illustrated in FIG. 7, or at least some of them. For example, the random and regular may be grouped together because it may be difficult to form distinguishable gaps with either pattern. The 'gaps' are throughout the area, and the only solution may be to simply acquire further measurement data over the whole area. With respect to J function defined above, the random and regular patterns typically exhibit (mainly or even only) values of J above one, while the clustered pattern exhibit (mainly or even only) values of J below one.

It is obvious to the reader that the gaps can be understood as sub-areas with no measurement location within the area of the acquired radio map. The gap may be distinguishable so that a computer running the procedure of FIG. 2 is capable of determining the boundaries of the gaps and, as a consequence, to find the geographical coordinates to define the gaps.

Figure 8:
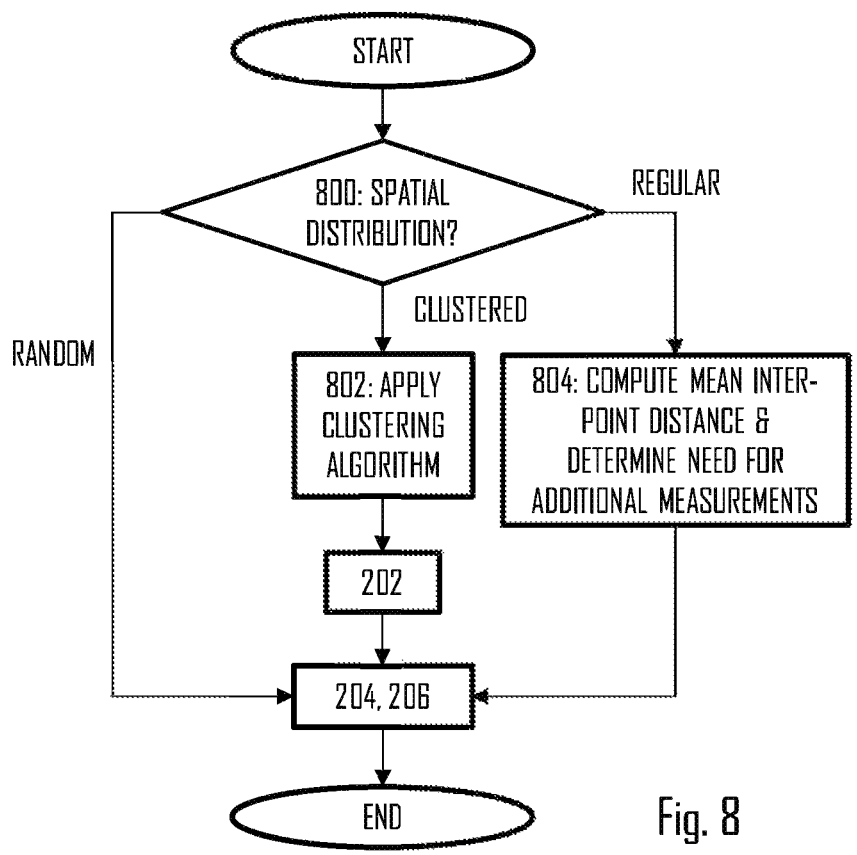
FIG. 8 illustrates a flow diagram of an embodiment of a process for determining the spatial distribution pattern of the radio map and acquisition of augmenting measurement data.

FIG. 8 illustrates a flow diagram of a procedure using the spatial point pattern test employing the three classes of FIG. 7. The process of FIG. 8 may be carried out in connection with determining whether the radio map meets the precision requirements or upon determining that the precision requirements are not met. Referring to FIG. 8, the spatial point pattern test may be performed on the measurement locations of the radio map upon acquiring the radio map, and the spatial distribution class may be determined for the radio map in block 800.

If the spatial point pattern test indicates that the spatial distribution class is 'random', it may be determined that no gaps can be distinguished from the radio map, and the geographical coordinates may be determined to define the whole area of the acquired radio map. Then, the process may proceed to block 204 for the transmission of the request for additional RF measurements.

If the spatial point pattern test indicates that the spatial distribution class is 'regular', it may be determined that no gaps can be distinguished from the radio map. In case the evaluation of the precision requirements has not yet been made, block 804 may be executed. In block 804, the mean distance x between the measurement locations is computed and compared with the mean distance requirement specified in the precision requirements. If the mean distance indicates that the precision requirements are met, e.g. the mean distance is smaller than the mean distance indicated in the precision requirements, the process may end. Otherwise, the process may proceed to block 204, and the geographical coordinates may be determined to define the whole area of the acquired radio map. In an embodiment, block 804 comprises computing deviation or variance τ of the inter-point distance of the measurement locations of the radio map and comparing the combination of x and τ with the precision requirements. For example, the following determination may be made:

$$[x-\tau, x+\tau] \in [d-\delta, d+\delta]$$

If the condition is satisfied, the radio map may be deemed to meet the precision requirements. Otherwise, the process may proceed to block 204 in the above-described manner to acquire additional RF measurements over the whole area.

If the spatial point pattern test indicates that the spatial distribution class is 'clustered', a clustering algorithm may be applied to discover the boundaries of the clusters, and the gaps as a complement of the clusters. An example of the clustering algorithm is a density-based spatial clustering of applications with noise (DBSCAN) algorithm developed by Ester et al. The clusters may be typically circular, so the clustering algorithm may define the boundaries of the clusters via geographical coordinates of the center and a radius/diameter of a cluster. Then, the gaps may be defined as a complement of the cluster boundaries. The geographical coordinates may then be defined by defining explicitly the coordinates of the gaps so that the coordinates exclude the clusters. An alternative method is to define the coordinates of the cluster(s) in the message requesting for the additional measurements and, additionally providing an information element indicating that the measurement area is a complement of the specified area. In this manner, a terminal device may, upon receiving the message determine whether or not it is located within the specified area. If the terminal device is in the specified area, it may omit the conduction of the measurements (complement of the operation described above). If the terminal device is not in the specified area, it may conduct the additional RF measurements.

Figure 9:
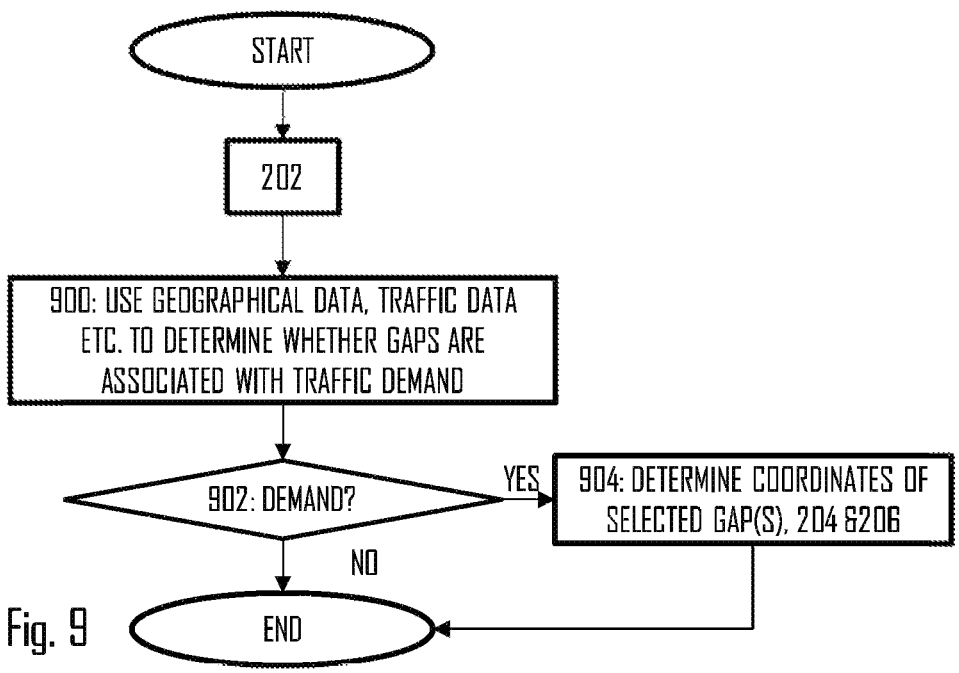
FIG. 9 illustrates a flow diagram of a procedure for allowing some gaps in the radio map.

As described above, some gaps may be allowed to the area. For example, locations of certain environments are not expected to need great coverage or high traffic load. Lakes, seas, forests etc. are such areas. FIG. 9 illustrates a procedure for determining whether or not the gaps can be allowed to meet the precision requirements. Referring to FIG. 9, after detecting a gap in block 202, geographical data, traffic data, etc. data on the location of the gap and available to the network node may be used in block 900 to determine whether or not the additional measurements are truly required for the gap. In another embodiment, the radio map is readily augmented with definition of areas for which the precision requirements do not apply. If it is determined that the gap is in an area where the precision requirements do not apply, the process may end. On the other hand, if it is determined that the gap is in an area where the precision requirements apply and that the precision requirements are not met, the process may proceed to block 904 where the geographical coordinates of the selected gap(s) are determined and the process may proceed to block 204 and 206.

Figure 10:
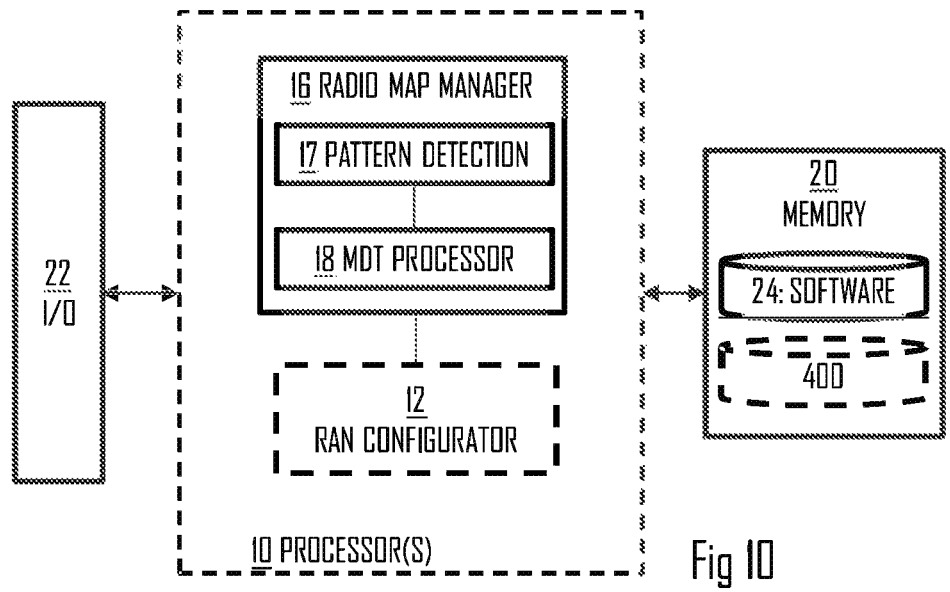
FIGS. 10 and 11 each illustrates a block diagram of an apparatus according to an embodiment.

FIG. 10 illustrates an apparatus comprising means for carrying out the process of FIG. 2 or any one of the embodiments described above. The apparatus may comprise a processing circuitry, such as at least one processor, and at least one memory 20 including computer program code or computer program instructions (software) 24, wherein the at least one memory and the computer program code (software) are configured, with the at least one processor, to cause the apparatus to carry out the process of FIG. 2 or any one of its embodiments described above. The apparatus may be for the network node implementing the RIC, OAM, NWDAF, or another corresponding entity. The apparatus may be a circuitry or an electronic device realizing some embodiments of the invention in the network node. The apparatus carrying out the above-described functionalities may thus be comprised in such a device, e.g. the apparatus may comprise a circuitry such as a chip, a chipset, a processor, a micro controller, or a combination of such circuitries for the network node.

The at least one processor or a processing circuitry may comprise a radio map manager 16 configured to carry the procedure of FIG. 2 or 4, for example. The radio map manager 16 may comprise a pattern detection circuitry 17 configured to carry out blocks 200 and 202 or blocks 402 and 404, or any other corresponding embodiment described above. The radio map manager may further comprise a measurement controller (MDT processor) 18 called by the pattern detection circuitry 17 and configured to carry out the collection of the additional RF measurement data from the terminal devices and access nodes at the locations of the gaps identified by the pattern detection circuitry 17.

In an embodiment, the at least one processor 10 further comprises a radio access network (RAN) configurator 12 configured to employ the updated radio map in configuring operational parameters of the radio access network. As described above, the radio map may be used for controlling multi-connectivity or handovers. The RAN configurator 12 may use the updated radio map to change at least one threshold related to a handover from one access node to another access node, or change at least one location for adding a new multi-connectivity cell for a terminal device. Numerous other implementations for reconfiguring the operational parameters can be envisaged, and they are beyond the scope of this description.

The memory 20 may be implemented using any suitable data storage technology, such as semiconductor-based memory devices, flash memory, magnetic memory devices and systems, optical memory devices and systems, fixed memory and removable memory. The memory 20 may comprise the radio map database 400 for storing the radio map.

The apparatus may further comprise a communication interface 22 comprising hardware and/or software for providing the apparatus with communication capability with other elements of the radio access network and/or the core network. Relevant interfaces and their requirements on the hardware and software depend on the system specifications.

Figure 11:
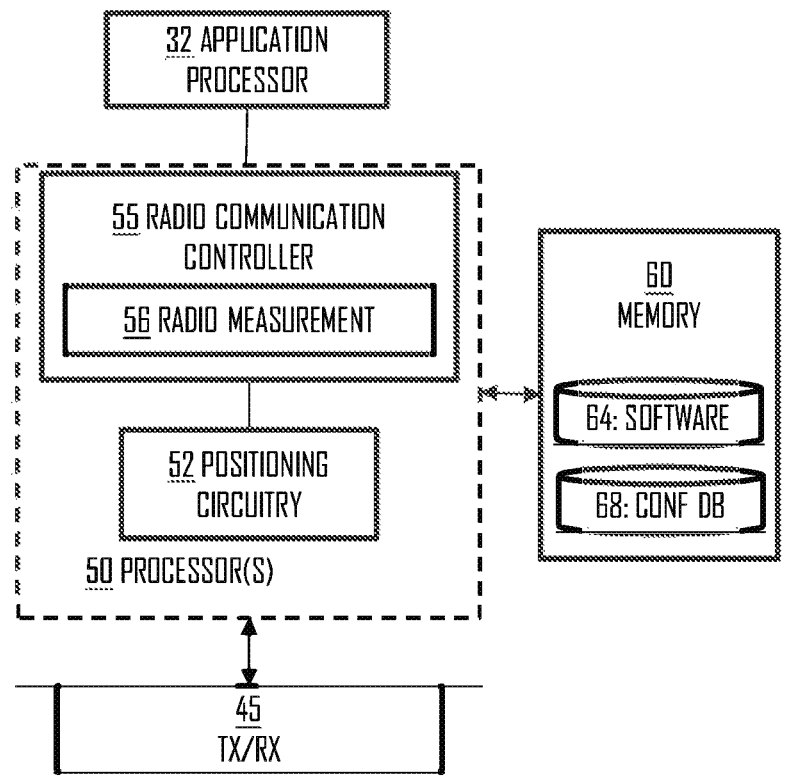

FIG. 11 illustrates an apparatus comprising means for carrying out the process of FIG. 3 or any one of the embodiments described above. The apparatus may comprise a processing circuitry 10, such as at least one processor, and at least one memory 60 including computer program code or computer program instructions (software) 64, wherein the at least one memory and the computer program code (software) are configured, with the at least one processor, to cause the apparatus to carry out the process of FIG. 3 or any one of its embodiments described above. The apparatus may be for the terminal device. The apparatus may be a circuitry or an electronic device realizing some embodiments of the invention in the terminal device. The apparatus carrying out the above-described functionalities may thus be comprised in such a device, e.g. the apparatus may comprise a circuitry such as a chip, a chipset, a processor, a micro controller, or a combination of such circuitries for the terminal device.

The at least one processor or processing circuitry 10 may realize a communication controller 55 controlling radio resource control (RRC) connections in the terminal device. The radio communication controller 55 may carry out communications with the access nodes of the radio access network and receive, for example, the messages requesting for the RF measurements in the specified geographical coordinates. Upon receiving such a request, the radio communication controller may determine the location of the terminal device. A positioning circuitry 52 may be used for that purpose. The positioning circuitry may support any one of the state-of-the-art positioning methods, e.g. one based on GNSS or one based on cellular positioning. The location of the terminal device may be monitored continuously or intermittently, and the location may be stored in the memory 60, for example. Upon determining that the location is in the area for the RF measurements, the communication controller 55 may use a radio measurement circuitry 56 to acquire the above-described measurement data and the respective measurement locations (by using the positioning circuitry), and transmit the measurement report(s) to the network node via the access node(s).

The apparatus may further comprise an application processor 32 executing one or more computer program applications that generate a need to transmit and/or receive data through the communication controller 55. The application processor may form an application layer of the apparatus. The application processor may execute computer programs forming the primary function of the apparatus. For example, if the apparatus is a sensor device, the application processor may execute one or more signal processing applications processing measurement data acquired from one or more sensor heads. If the apparatus is a computer system of a vehicle, the application processor may execute a media application and/or an autonomous driving and navigation application. Positioning of the apparatus may be beneficial for all these applications.

The apparatus may further comprise a communication interface 45 providing the apparatus with radio communication capability, as described above. The communication interface 45 may include, for example, an antenna, one or more radio frequency filters, a power amplifier, and one or more frequency converters. The communication interface 45 may comprise hardware and software needed for realizing the radio communications over the radio interface, e.g. according to specifications of an LTE or 5G radio interface.

The memory 60 may be implemented using any suitable data storage technology, such as semiconductor-based memory devices, flash memory, magnetic memory devices and systems, optical memory devices and systems, fixed memory and removable memory. The memory 60 may comprise a configuration database storing information on, for example, the current location of the apparatus or whether or not the MDT measurements are currently enabled. The apparatus may determine to omit the additional RF measurements even if it is located in the requested measurement area, e.g. if the battery of the terminal device is low.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIGS. 2 to 9, or any of the embodiments thereof may also be carried out in the form of one or more computer processes defined by one or more computer programs. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units. References to computer-readable program code, computer program, computer instructions, computer code etc. should be understood to express software for a programmable processor such as programmable content stored in a hardware device as instructions for a processor, or as configured or configurable settings for a fixed function device, gate array, or a programmable logic device.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus comprising:
   at least one processor; and
   at least one memory storing computer program instructions that cause, with the at least one processor, the apparatus to perform the following:
   acquiring a radio map of an area, the radio map based on radio frequency measurements performed between at least one access node of a wireless network and terminal devices within the area;
   detecting at least one gap in the radio map and determining geographical coordinates of the at least one gap, wherein the geographical coordinates define boundaries of the at least one gap;
   causing transmission of a message comprising at least one information element requesting for additional measurements and comprising the geographical coordinates of the at least one gap;
   in response to the message receiving at least one radio frequency measurement report related to at least one terminal device and comprising radio frequency measurement data and at least one measurement location where the radio frequency measurement data has been measured;
   updating the radio map on the basis of the radio frequency measurement data; and
   conducting a spatial point pattern test on the radio map to determine a spatial distribution of the radio frequency measurements in the area and to detect the at least one gap.

2. The apparatus of claim 1, wherein the computer program instructions cause, with the at least one processor, the apparatus to classify the spatial distribution into one of a plurality of classes and to detect the at least one gap on the basis of the classification.

3. The apparatus claim 2, wherein one of the plurality classes is clustered, and wherein the computer program instructions cause, with the at least one processor, the apparatus to classify the spatial distribution as clustered upon detecting that the spatial distribution forms clusters of a plurality of measurement locations and forms the at least one gap between the clusters, and to determine the geographical coordinates defining the at least one gap.

4. The apparatus of claim 2, wherein one of the plurality classes is a regular distribution and, wherein the computer program instructions cause, with the at least one processor, the apparatus to classify the spatial distribution as regular upon detecting that the spatial distribution of a plurality of measurement locations is even or substantially even in the area as distances between neighboring measurement locations are equal or within a determined range, and to cause transmission of a message comprising at least one information element requesting for additional measurements over the whole area.

5. The apparatus of claim 1, wherein the computer program instructions cause, with the at least one processor, the apparatus to determine a subset of cells of the wireless network, the subset providing radio coverage of the at least one gap, and to configure the determined at least one cell to transmit the message requesting for the additional measurements.

6. The apparatus of claim 1, wherein the computer program instructions cause, with the at least one processor, the apparatus to configure or reconfigure at least one parameter of the wireless network on the basis of the updated radio map.

7. The apparatus of claim 1, wherein the computer program instructions cause, with the at least one processor, the apparatus to receive from a client application a request for the radio map, the request specifying precision requirements for the requested radio map, and to perform the gap detection and the updating of the radio map on the basis of the precision requirements.

8. A system comprising an apparatus comprising: at least one processor; and at least one memory storing computer program instructions that cause, with the at least one processor, the apparatus to perform the following:
    acquiring a radio map of an area, the radio map based on radio frequency measurements performed between at least one access node of a wireless network and terminal devices within the area;
    detecting at least one gap in the radio map and determining geographical coordinates of the at least one gap, wherein the geographical coordinates define boundaries of the at least one gap;
    causing transmission of a message comprising at least one information element requesting for additional measurements and comprising the geographical coordinates of the at least one gap;
    in response to the message receiving at least one radio frequency measurement report related to at least one terminal device and comprising radio frequency measurement data and at least one measurement location where the radio frequency measurement data has been measured;
    updating the radio map on the basis of the radio frequency measurement data; and
    conducting a spatial point pattern test on the radio map to determine a spatial distribution of the radio frequency measurements in the area and to detect the at least one gap and another apparatus comprising: at least one processor; and at least one memory storing computer program instructions that cause with the at least one processor the apparatus to perform the following:
    receiving, via an access node of a wireless network, a message comprising at least one information element requesting for radio frequency measurements and comprising geographical coordinates of at least one area for the radio frequency measurements wherein the geographical coordinates define boundaries of the at least one gap;
    in response to the message, determining a current location of the apparatus and:
    if the current location is within the at least one area, performing said requested radio frequency measurements and causing transmission of at least one measurement report comprising measurement data based on the performed radio frequency measurements; and
    if the current location is outside the at least one area, omitting said radio frequency measurements.

9. A method for a network node, comprising:
    acquiring a radio map of an area, the radio map based on radio frequency measurements performed between at least one access node of a wireless network and terminal devices within the area;
    detecting at least one gap in the radio map and determining geographical coordinates of the at least one gap, wherein the geographical coordinates define boundaries of the at least one gap;
    causing transmission of a message comprising at least one information element requesting for additional measurements and comprising the geographical coordinates of the at least one gap;
    in response to the message, receiving at least one radio frequency measurement report related to at least one terminal device and comprising radio frequency measurement data and at least one measurement location where the radio frequency measurement data has been measured;
    updating the radio map on the basis of the radio frequency measurement data; and
    conducting a spatial point pattern test on the radio map to determine a spatial distribution of the radio frequency measurements in the area and to detect the at least one gap.

* * * * *